United States Patent
Carnelli et al.

(10) Patent No.: US 7,651,049 B2
(45) Date of Patent: Jan. 26, 2010

(54) HELICOPTER WITH AN AUXILIARY LUBRICATING CIRCUIT

(75) Inventors: Silvano Carnelli, Cislago (IT); Roberto Regonini, Somma Lombardo (IT); Massimo Forni, Ranco (IT); Giuseppe Gasparini, Gallarate (IT)

(73) Assignee: Agusta, SpA, Samarate (IT)

( * ) Notice: Subject to any disclaimer, the term of this patent is extended or adjusted under 35 U.S.C. 154(b) by 405 days.

(21) Appl. No.: 11/454,229

(22) Filed: Jun. 16, 2006

(65) Prior Publication Data
US 2009/0071753 A1 Mar. 19, 2009

(30) Foreign Application Priority Data
Jun. 30, 2005 (EP) .................... 05425471

(51) Int. Cl.
*F01M 9/06* (2006.01)
(52) U.S. Cl. .............. 244/17.11; 244/1 R; 184/65; 184/12
(58) Field of Classification Search ........... 184/65, 184/81, 5, 6.12; 244/1 R, 17.11, 17.27, 60, 244/129.1, 136
See application file for complete search history.

(56) References Cited

U.S. PATENT DOCUMENTS

| 4,271,928 A | 6/1981 | Northern |
| 5,121,815 A | 6/1992 | Francois et al. |

FOREIGN PATENT DOCUMENTS

GB 1 349 012 A 3/1974

*Primary Examiner*—Timothy D Collins
(74) *Attorney, Agent, or Firm*—Mitchell P. Brook; Luce, Forward, Hamilton & Scripps

(57) ABSTRACT

There is described a helicopter having a first member movable with respect to a second member; lubricated supporting means for supporting the first member with respect to the second member; and a primary lubricating circuit for lubricating the supporting means and in turn having primary storage means for accumulating a lubricating fluid, and primary fluid feed means for feeding the lubricating fluid to the supporting means; the helicopter also has an auxiliary lubricating circuit supplied continually by the primary storage means with a first lubricating fluid flow value, and itself continually supplying the supporting means with a second lubricating fluid flow value lower than the first value, so as to produce an auxiliary storage volume of lubricating fluid for use in the event of breakdown of the primary lubricating circuit.

10 Claims, 2 Drawing Sheets

HELICOPTER WITH AN AUXILIARY LUBRICATING CIRCUIT

The present invention relates to a helicopter with an auxiliary lubricating circuit.

BACKGROUND OF THE INVENTION

As is known, helicopters are normally equipped with a number of transmissions for transmitting motion from one or more turbines to the main and/or tail rotor, and/or from the turbine to a number of accessory devices, i.e. for powering on-board equipment, for example.

The transmissions normally comprise a first member movable with respect to a second member; and a number of bearings for supporting the first member with respect to the second member. Helicopters also comprise a circuit for supplying and lubricating the bearings with lubricating oil contained inside special tanks.

In the event of damage to the lubricating circuit, the oil pressure falls, thus preventing operation of the transmission.

In the industry, a need is felt to ensure, in such cases, correct operation of the transmission for a predetermined length of time, e.g. at least thirty minutes and preferably an hour, to allow the helicopter to land.

Moreover, for missions of a given duration, helicopter certification regulations require that the helicopter be able to maintain level flight for said predetermined length of time.

SUMMARY OF THE INVENTION

It is an object of the present invention to provide a helicopter designed to meet the aforementioned requirements in a straightforward, low-cost manner.

According to the present invention, there is provided a helicopter as claimed in the attached claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
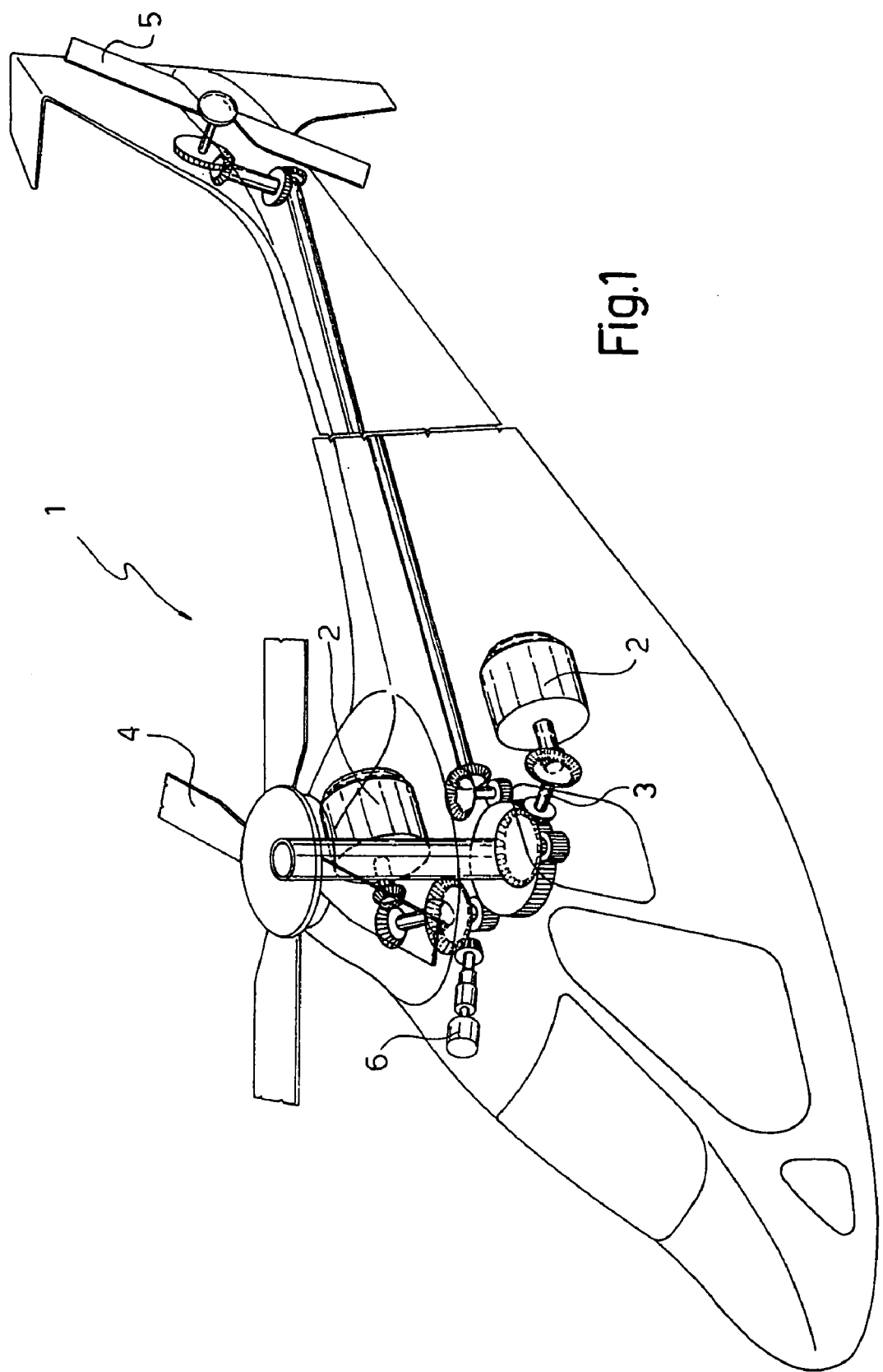
FIG. 1 shows a view in perspective of a helicopter in accordance with the present invention.

Number 1 in FIG. 1 indicates a helicopter comprising two turbines 2; a main rotor 4; a tail rotor 5; and a primary transmission 3 for transmitting motion from turbines 2 to main rotor 4 and tail rotor 5.

Helicopter 1 also comprises a number of secondary transmissions 6 (shown schematically) for transmitting motion from primary transmission 3 to respective known accessory devices (not shown), i.e. for powering respective on-board equipment, for example.

As described in more detail below, each transmission 3, 6 must be oil-lubricated for it to function properly.

Figure 2:
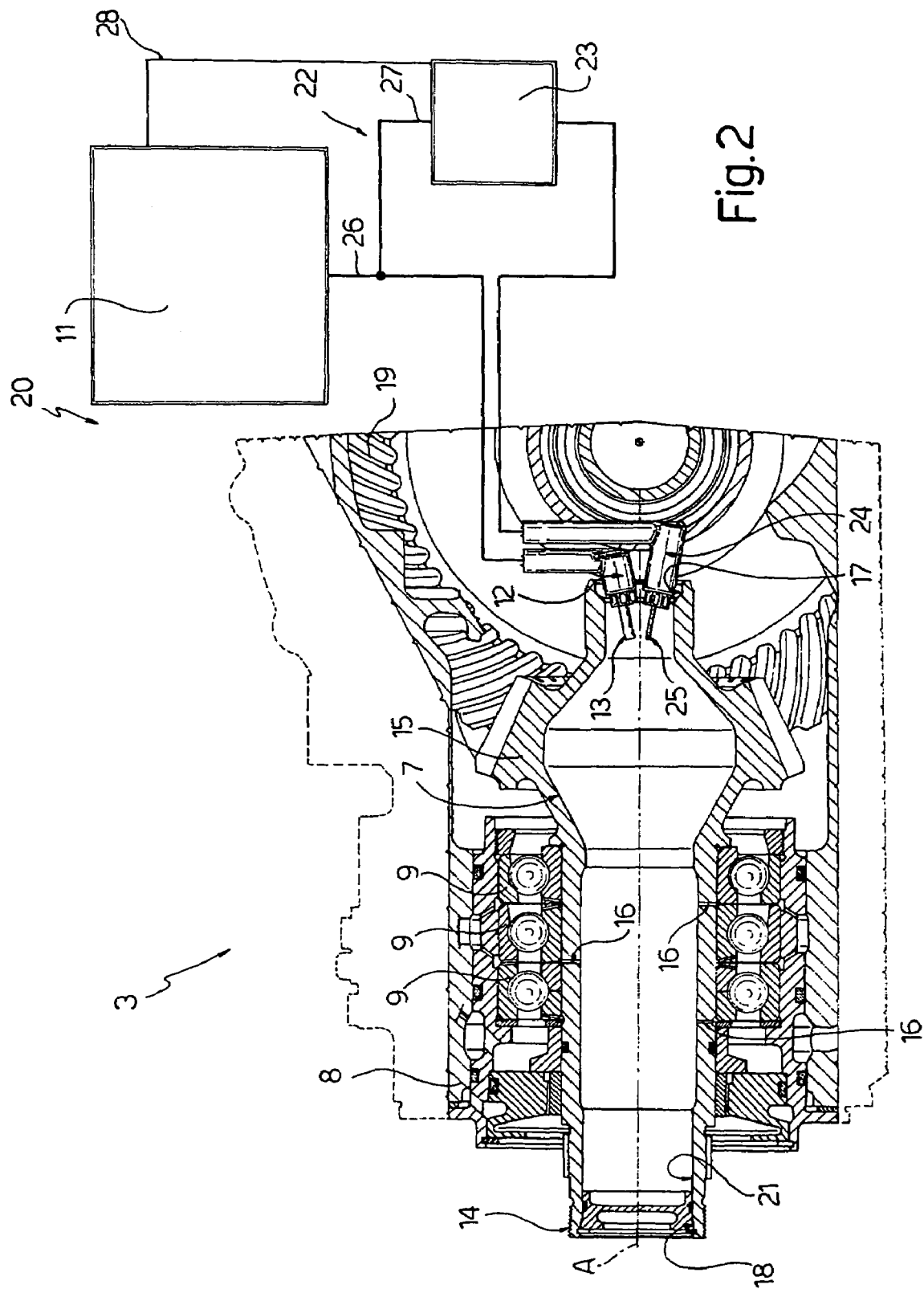
FIG. 2 shows a larger-scale axial section of a transmission of the FIG. 1 helicopter, and an auxiliary lubricating circuit for emergency supply of the transmission.

For which purpose, as shown in FIG. 2, helicopter 1 comprises a lubricating circuit 20 for feeding oil to transmissions 3, 6. More specifically, lubricating circuit 20 comprises a tank 11; and a number of nozzles 12 (only one shown) for feeding oil from tank 11 to respective transmissions 3, 6.

For the sake of simplicity, and purely by way of example, the following description refers to transmission 3 and respective nozzle 12.

Moreover, transmission 3 is only described and illustrated as required for a clear understanding of the present invention.

More specifically, the FIG. 2 transmission 3 comprises an outer casing 8 secured to a fixed structure (not shown) of helicopter 1; a transmission shaft 7 mounted inside casing 8 to rotate about an axis A, and for connecting turbines 2 functionally to a bevel gear 19, in turn connected to further components of transmission 3; and a number of bearings 9 interposed radially between shaft 7 and casing 8 to support shaft 7 in rotary, axially-fixed manner inside casing 8.

With reference to FIG. 2, shaft 7 defines a threaded circumferentially outer portion 14 and a circumferentially outer bevel gear 15 connected functionally to turbines 2 and gear 19 respectively.

Portion 14 is formed on an axial end 18 of shaft 7, and gear 15 is formed on shaft 7 adjacent to an axial end 17 opposite end 18.

Portion 14 projects axially from casing 8 for easy connection to turbines 2.

Bearings 9 are rolling bearings, and are interposed axially between portion 14 and gear 15.

Shaft 7 defines an oil flow path from nozzle 12 to bearings 9.

More specifically, shaft 7 defines a coaxial inner chamber 21, which is open at end 17 to let oil in, and closed at end 18 to prevent outflow of oil through end 18.

Chamber 21 is connected fluidically to bearings 9 by a number of—in the example shown, three—conduits 16 formed radially through shaft 7 to allow the incoming oil from end 17 to flow to bearings 9.

Nozzle 12 has an outlet 13 projecting inside chamber, 21 of respective transmission 3 through end 17 to eject the oil for lubricating bearings 9 directly into chamber 21.

More specifically, each nozzle 12 is connected to tank 11 by a respective fluid line 26, along which is located a respective known pump (not shown).

According to an important aspect of the present invention, helicopter 1 comprises an auxiliary lubricating circuit 22 continually supplied from tank 11 with a first oil flow value, and itself continually supplying bearings 9 of transmission 3 with a second oil flow value lower than the first oil flow value, so as to produce an auxiliary oil storage volume for use in the event of breakdown of lubricating circuit 20.

More specifically, auxiliary lubricating circuit 22 comprises an auxiliary tank 23 filled continually from tank 11 to produce said auxiliary storage volume; and an auxiliary nozzle 24 supplied from auxiliary tank 23 and for feeding oil in the form of droplets into chamber 21 to permit temporary lubrication of bearings 9 of transmission 3 even in the event of breakdown of lubricating circuit 20.

Auxiliary tank 23 is supplied from tank 11 along a line 27 connected to line 26.

Like nozzle 12, auxiliary nozzle 24 has an outlet 25 projecting inside chamber 21 of transmission 3 to drip-feed oil to ensure temporary lubrication of bearings 9 in the event of breakdown of lubricating circuit 20.

More specifically, auxiliary tank 23 is located higher up than outlet 25 so that drip feed occurs by force of gravity.

Outlet 25 is smaller than outlet 13 in a direction perpendicular to the oil flow, so that, when tank 11 is working properly, more oil is entering than leaving auxiliary tank 23, and sufficient oil accumulates inside auxiliary tank 23 to permit temporary lubrication of bearings 9 in the event of breakdown of lubricating circuit 20.

Outlet 25 is also smaller than line 27 in a direction perpendicular to the oil flow.

Each auxiliary tank 23 has a hole (not shown) for draining off oil along a conduit 28 when auxiliary tank 23 is completely full of oil.

In actual use, shaft 7 is supported in rotary and axially-fixed manner by bearings 9, which must be oiled to function correctly.

In normal operating conditions of lubricating circuit 20, nozzle 12 is fed with oil from tank 11 along line 26.

Oil is fed by nozzle 12 into chamber 21, from where it flows along conduits 16 to bearings 9 to lubricate the bearings.

More specifically, shaft 7 imparts to the oil fed into chamber 21 a centrifugal radial component of motion with respect to axis A, which assists oil flow towards conduits 16.

In normal operating conditions of lubricating circuit 20, a portion of the oil flowing from tank 11 along line 26 flows along line 27 to auxiliary lubricating circuit 22.

More specifically, said portion of oil accumulates in auxiliary tank 23 and drips continually from auxiliary nozzles 24 into chamber 21 to contribute to a lesser extent towards lubricating bearings 9.

More specifically, oil is accumulated by virtue of the oil flow entering auxiliary tank 23 along line 27 being greater than the oil flow leaving auxiliary tank 23 from auxiliary nozzles 24; which difference in oil flow is produced by outlet 25 being smaller, in a direction perpendicular to the oil flow, than outlet 13 and line 27.

In the event of breakdown of lubricating circuit 20, no oil is fed by nozzles 12 into chamber 21.

In which case, auxiliary lubricating circuit 22 permits temporary lubrication of bearings 9 of transmission 3 to allow the transmission to operate for a predetermined length of time.

More specifically, the oil accumulated in auxiliary tank 23 continues to drip gradually by force of gravity from auxiliary nozzle 24 into chamber 21; and the oil droplets are fed centrifugally along conduits 16 to bearings 9 to keep bearings 9 lubricated for a predetermined length of time even in the event of breakdown of lubricating circuit 20.

In which case, helicopter 1 has a predetermined length of time, e.g. at least half an hour and preferably an hour, in which transmission 3 continues to function until an appropriate landing site is located.

More specifically, helicopter 1 is able to maintain level flight for said predetermined length of time, thus conforming with certification requirements governing missions of predetermined duration.

Clearly, changes may be made to helicopter 1 as described and illustrated herein without, however, departing from the protective scope defined in the accompanying Claims.

The invention claimed is:

1. A helicopter comprising:
  a first and a second member;
  lubricated supporting means for supporting said first member movably with respect to said second member; and
  a primary lubricating circuit for lubricating said supporting means and in turn comprising primary storage means for accumulating a lubricating fluid, and primary fluid feed means for feeding said lubricating fluid to said supporting means;
  said helicopter comprising an auxiliary lubricating circuit supplied continually by said primary storage means with a first lubricating fluid flow value, and itself continually supplying said supporting means with a second lubricating fluid flow value lower than said first value, so as to produce an auxiliary storage volume of lubricating fluid for use in the event of breakdown of said primary lubricating circuit;
  said auxiliary storage volume being located outside the first member;
  said helicopter being characterized in that said first member rotates about an axis with respect to said second member, and defines internally a chamber supplied by said primary and said auxiliary lubricating circuit and fluidly connected to said supporting means by an opening formed in the first member and radial with respect to said axis.

2. A helicopter as claimed in claim 1, characterized in that said auxiliary lubricating circuit comprises auxiliary storage means supplied by said primary storage means and defining said auxiliary storage volume; and auxiliary fluid feed means supplied by said auxiliary storage means and in turn supplying said supporting means by means of an outlet, which is smaller than an outlet of said primary fluid feed means in a direction crosswise to the flow of said lubricating fluid.

3. A helicopter as claimed in claim 2, characterized in that said auxiliary storage means are supplied by said primary storage means along a fluid line, and in that said outlet of said auxiliary fluid feed means is smaller than said fluid line in a direction crosswise to the flow of said lubricating fluid.

4. A helicopter as claimed in claim 3, characterized by comprising a transmission comprising said first and said second member.

5. A helicopter as claimed in claim 3, characterized in that said primary storage means supply said primary lubricating circuit and said auxiliary lubricating circuit via the same fluid line.

6. A helicopter as claimed in claim 2, characterized in that said primary storage means supply said primary lubricating circuit and said auxiliary lubricating circuit via the same fluid line.

7. A helicopter as claimed in claim 2, characterized by comprising a transmission comprising said first and said second member.

8. A helicopter as claimed in claim 1, characterized in that said primary storage means supply said primary lubricating circuit and said auxiliary lubricating circuit via the same fluid line.

9. A helicopter as claimed in claim 8, characterized by comprising a transmission comprising said first and said second member.

10. A helicopter as claimed in claim 1, characterized by comprising a transmission comprising said first and said second member.

* * * * *